(12) United States Patent
Spychalla (10) Patent No.: US 7,463,451 B2
(45) Date of Patent: Dec. 9, 2008

(54) DATA STORAGE CARTRIDGE WITH PIN RECEPTION SLOT

(75) Inventor: Leo W. Spychalla, Cottage Grove, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 11/520,504

(22) Filed: Sep. 13, 2006

(65) Prior Publication Data

US 2007/0008872 A1    Jan. 11, 2007

Related U.S. Application Data

(63) Continuation of application No. 10/725,232, filed on Dec. 1, 2003, now Pat. No. 7,123,445.

(51) Int. Cl.
*G11B 23/02* (2006.01)
*G11B 17/02* (2006.01)

(52) U.S. Cl. .................................. 360/133; 360/97.01
(58) Field of Classification Search ................. 360/133, 360/97.01, 98.01
See application file for complete search history.

(56) References Cited

U.S. PATENT DOCUMENTS

| | | | | |
|---|---|---|---|---|
| 4,503,474 A | * | 3/1985 | Nigam | 360/133 |
| 4,614,990 A | * | 9/1986 | Saito | 360/133 |
| 4,791,511 A | * | 12/1988 | Davis | 720/739 |
| 4,794,480 A | * | 12/1988 | Jones et al. | 360/99.04 |
| 4,858,050 A | * | 8/1989 | Ashe et al. | 360/133 |
| 4,989,106 A | * | 1/1991 | Uehara | 360/99.02 |
| 5,121,296 A | | 6/1992 | Hsu | |
| 5,140,478 A | * | 8/1992 | Yoshida | 360/97.01 |
| 5,235,481 A | * | 8/1993 | Kamo et al. | 360/97.01 |
| 5,262,918 A | * | 11/1993 | Tannert | 360/133 |
| 5,483,419 A | | 1/1996 | Kaczeus et al. | |
| 5,627,707 A | * | 5/1997 | Akiyama et al. | 360/133 |
| 6,215,613 B1 | | 4/2001 | Arris et al. | |
| 6,282,059 B1 | * | 8/2001 | Ikebe et al. | 360/133 |
| 6,298,034 B1 | * | 10/2001 | Hashimoto | 720/740 |
| 6,351,374 B1 | | 2/2002 | Sherry | |
| 6,483,107 B1 | | 11/2002 | Rabinovitz et al. | |
| 6,490,242 B1 | | 12/2002 | Bonn et al. | |
| 6,510,131 B1 | | 1/2003 | Tran et al. | |
| 6,618,246 B2 | | 9/2003 | Sullivan et al. | |
| 6,765,751 B2 | * | 7/2004 | Huang et al. | 360/97.01 |
| 6,789,261 B2 | * | 9/2004 | Oishi | 720/719 |
| 6,813,117 B2 | | 11/2004 | Blair et al. | |
| 6,906,918 B2 | | 6/2005 | Rabinovitz | |

\* cited by examiner

*Primary Examiner*—Jefferson Evans
(74) *Attorney, Agent, or Firm*—Eric D. Levinson (57) ABSTRACT

A data storage cartridge is provided that is configured to be received by a socket including an actuator pin. The data storage cartridge includes a housing and a non-tape storage medium. The housing defines an access window and includes a planar member surrounded by a plurality of side walls. An elongated pin reception slot is defined through the planar member and is configured to receive the actuator pin of the socket. The non-tape storage medium is maintained within the housing and is configured to be accessed from a point external to the data storage cartridge via the access window.

20 Claims, 8 Drawing Sheets

DATA STORAGE CARTRIDGE WITH PIN RECEPTION SLOT

CROSS-REFERENCE TO RELATED APPLICATION

This application is a continuation application of U.S. patent application Ser. No. 10/725,232, filed Dec. 1, 2003 now U.S. Pat. No. 7,123,445, which is incorporated herein by reference.

FIELD OF THE INVENTION

The present invention generally relates to a data storage cartridge. More particularly, it relates to a data storage cartridge including a hard drive and a door.

BACKGROUND OF THE INVENTION

Data storage tape cartridges have been used for decades in the computer, audio, and video fields as a means for storing electronic files. The data storage tape cartridges continue to be a popular form of recording large volumes of information for subsequent retrieval and use, particularly in a library setting. Automated, data storage cartridge libraries provide access to vast amounts of electronic data by storing and managing data storage tape cartridges.

In a conventional, automated, data storage cartridge library system, an automation unit, such as a robotic arm or other mechanism, typically services a plurality of data storage tape cartridge locations. The automation unit selectively retrieves a data storage tape cartridge from one of the storage locations and loads the retrieved data storage tape cartridge into a designated tape drive. The tape drive reads data from or writes new data to the data storage tape cartridge. When the tape drive is finished with the data storage tape cartridge, the automation unit retrieves the data storage tape cartridge from the tape drive and returns it to the assigned storage location. A host computing system communicates with the library controlling unit to typically control the operation of the automated cartridge library. In this way, a large number of data storage tape cartridges are automatically accessible by one or more tape drives.

To manipulate a data storage tape cartridge, the automation unit typically includes an interface, such as a gripper on a robotic arm, that engages the data storage tape cartridge and allows the automation unit to convey and manipulate the orientation of the data storage tape cartridge. Because the data storage tape cartridges must be positioned in a precise manner for the robotic arm to grasp and position them correctly, the data storage tape cartridges and the storage locations are constructed with exact dimensions. Accordingly, the data storage tape cartridges that the library system houses typically have substantially similar, if not identical, form factors in order to be properly received by the interface of the automation unit.

Although conventional, automated libraries provide access to vast amounts of information, conventional, automated libraries using data storage tape cartridges do not allow for true random access of files stored on the data storage tape cartridges. In particular, a conventional data storage tape cartridge consists of a tape, i.e., an elongated flexible medium having a magnetic recording layer, wound on one or more wheels or hubs. Data is recorded and retrieved by inserting the data storage tape cartridge within a tape drive and passing the recording medium in front of one or more read/write heads. The tape drives are usually streaming devices in which data is recorded in a serpentine fashion as the tape streams back and forth. In particular, the tape drive typically writes the data along a number of pin reception tracks that span the length of the medium. For this reason, data storage tape cartridges can be viewed as sequentially storing the data in a linear format.

The linear data storage format prevents true random access to individual files. Rather, a tape drive must scan through the entire length of the tape until the appropriate file mark is identified, thereby increasing the file retrieval time. Due to the lack of true random access to individual files stored within the data storage tape cartridges and the affinity for the pre-existing data storage tape cartridge library, a need exists for a data storage cartridge configured to house and protect a non-tape storage device and yet be compatible with conventional, automated, data storage tape cartridge library systems.

SUMMARY OF THE INVENTION

One aspect of the present invention relates to a data storage cartridge configured to be received by a socket including an actuator pin. The data storage cartridge includes a housing and a non-tape storage medium. The housing defines an access window and includes a planar member surrounded by a plurality of side walls. An elongated pin reception slot is defined through the planar member and is configured to receive the actuator pin of the socket. The non-tape storage medium is maintained within the housing and is configured to be selectively accessed from a point external to the data storage cartridge via the access window.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

DETAILED DESCRIPTION OF THE PREFERRED EMBODIMENTS

Figure 1:
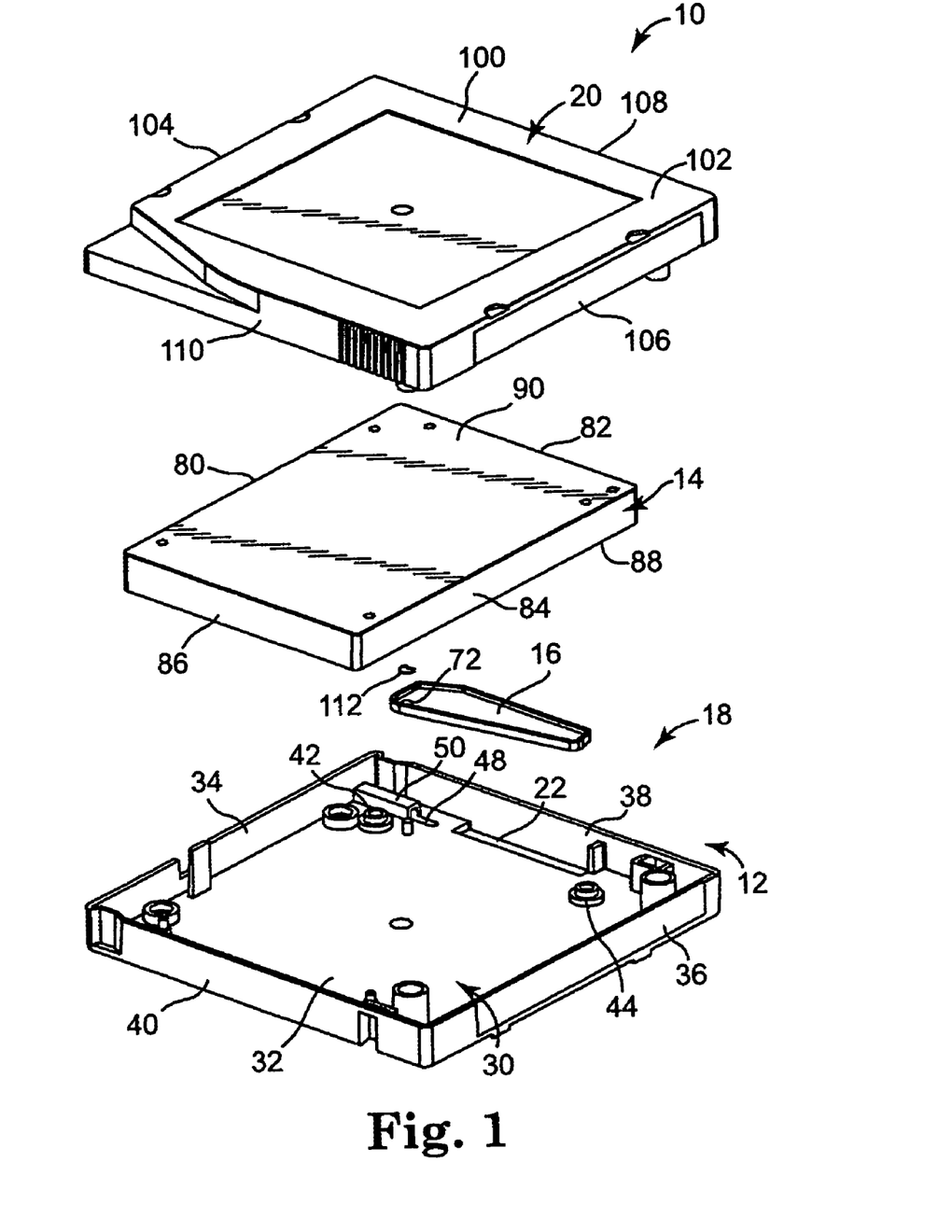
FIG. 1 is a perspective, exploded view of one embodiment of a data storage cartridge with a door in accordance with the present invention.

An exemplary data storage cartridge 10 according to one embodiment of the present invention is generally illustrated in FIG. 1. The data storage cartridge 10 includes a housing 12, a hard drive 14, and a door 16. The housing 12 includes a first housing section 18 and a second housing section 20 sized to collectively receive and substantially enclose the hard drive 14. In one preferred embodiment, the first housing section 18 serves as a base whereas the second housing section 20 serves as a cover. Remaining components of the data storage cartridge 10 are described in greater detail below. However, it should generally be understood that the first housing section 18 defines an access window 22 to provide access to the hard drive 14 from a point external to the data storage cartridge 10, and the door 16 rotatably couples with the first housing section 18. More particularly, the door 16 rotates to selectively open and close the access window 22, thereby selectively allowing access to the hard drive 14. It should be understood that the directional terminology such as "cover," "base," "first," "second," etc., are used for purposes of illustration only, and are in no way limiting.

Figure 2:
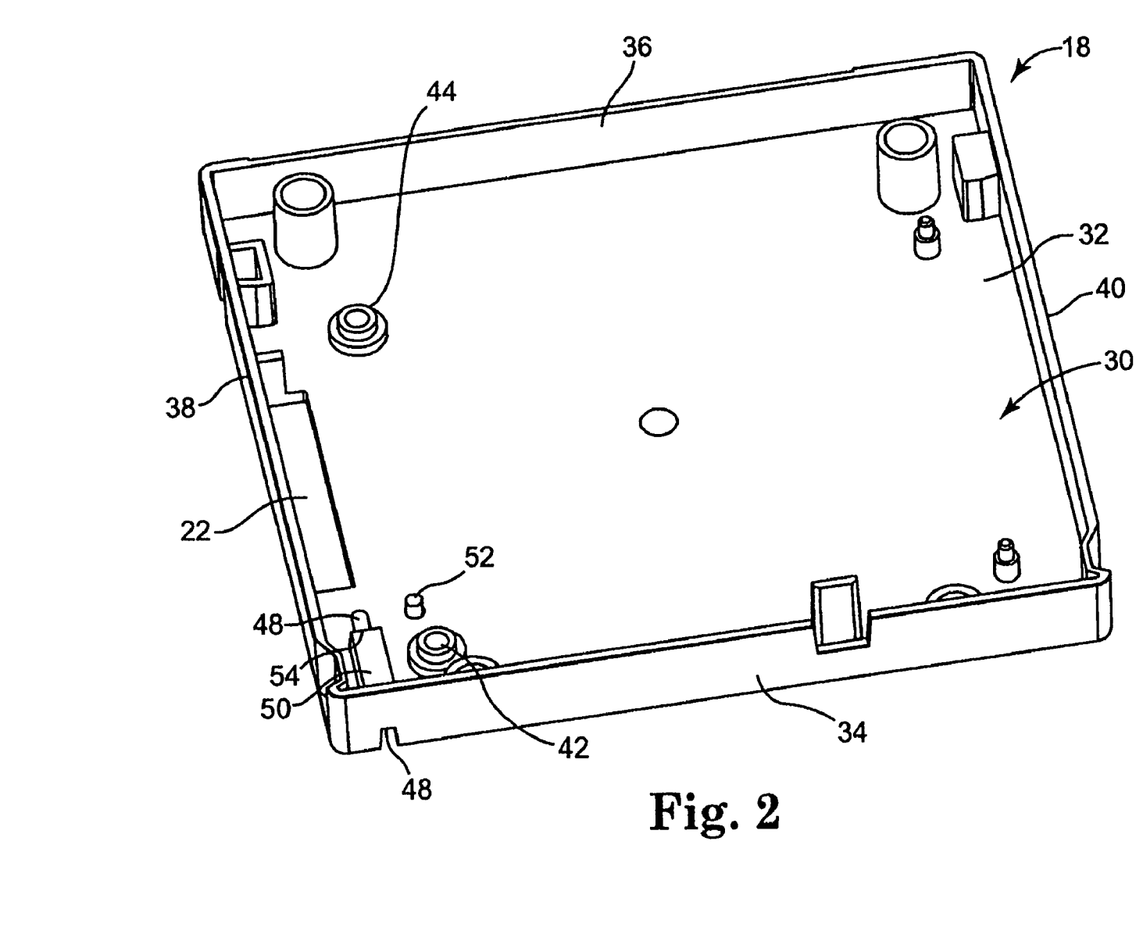
FIG. 2 is a perspective view of one embodiment of a first housing section of the data storage cartridge of FIG. 1.

In one embodiment, best illustrated in FIG. 2, the first housing section 18 has a substantially planar member 30 which defines an interior surface 32 and an exterior surface 33 (FIG. 6) opposite the interior surface 32. The first housing section 18 also forms a leading wall 34, a trailing wall 36, a first side wall 38, and a second side wall 40, each of which extends in a generally perpendicular fashion from a different edge of the planar member 30, more particularly, the interior surface 32. At least two attachment pillars 42 and 44 extend from the interior surface 32 and define openings opposite the interior surface 32. The attachment pillars 42 and 44 are each hollow to receive a screw or other connection device and facilitate coupling of the first housing section 18 to the hard drive 14. The planar member 30 further defines the access window 22 near the first side wall 38. The access window 22 is preferably elongated and runs parallel to the first side wall 38. As such, the access window 22 has a width in a direction parallel to the leading edge 36 and a length in a direction parallel to the first side edge 38.

The planar member 30 and the leading wall 34 collectively define a pin reception slot 48 longitudinally spaced from the access window 22 and laterally spaced from the first side wall 38. In particular, the pin reception slot 48 extends through the planar member 30 to and through the leading wall 34. In one embodiment, the first housing section 18 further defines a pin reception track 50 which encloses a substantial portion of the pin reception slot 48. In particular, the pin reception track 50 extends from the leading wall 34 over a substantial portion of the pin reception slot 48 to an interior track end 54. The pin reception track 50 generally has an inverted U-shape, the cavity formed by the inverted U-shape being aligned with and above the substantial portion of the pin reception slot 48.

The first housing section 18 further defines a pivot post 52 extending from the interior surface 32. Preferably, the pivot post 52 is positioned between the pin reception slot 48 and the second side wall 40 and is substantially nearer the first side wall 38 than the second side wall 40. In addition, the pivot post 52 is preferably positioned away from the leading wall 34 a distance similar to the distance the interior track end 54 of the pin reception track 50 is positioned away from the leading wall 34. The pivot post 52 preferably has a substantially circular cross-section and is adapted to rotatably receive the door 16, as described in greater detail below. Preferably, the first housing section 18 is formed of a polymeric material. More preferably, the first housing section 18 is formed by injection molding of a suitable material such as polycarbonate. Alternatively, other materials and/or manufacturing techniques can be employed to form the first housing section 18.

Figure 3:
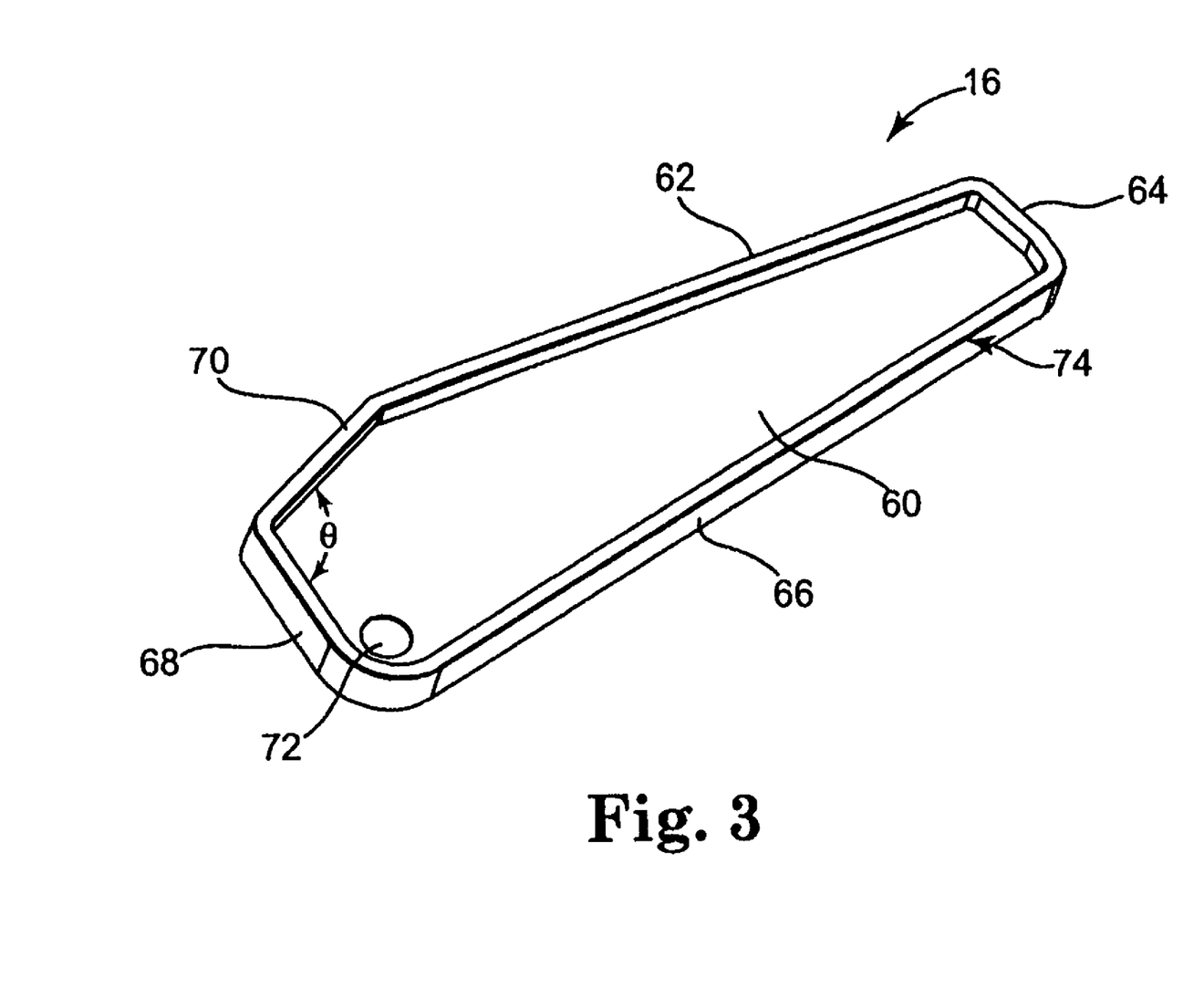
FIG. 3 is a perspective view of one embodiment of a door of the data storage cartridge of FIG. 1.

One exemplary embodiment of the door 16 is generally illustrated in the top view of FIG. 3. The door 16 defines a planar member 60 having a first edge 62, a second edge 64, a third edge 66, and a fourth edge 68. In particular, the planar member 60 defines the second edge 64 extending from the first edge 62, the third edge 66 extending from the second edge 64 opposite the first edge 62, and the fourth edge 68 extending from the third edge 66 opposite the second edge 64. The fourth edge 68 extends from the third edge 66 to the first edge 62 opposite the second edge 64. In one embodiment, each of the first and fourth edges 62 and 68 are substantially linear. In a preferred embodiment, the first edge 62 is substantially linear except for an angled portion 70 near the intersection of the fourth edge 68 and the first edge 62. The angled portion 70 is adapted to provide additional clearance of the access window 22 (FIG. 2), as will be further described below. In one embodiment, the angled portion 70 extends from the fourth edge 68 to form an interior angle θ between 105° and 150°.

With additional reference to FIG. 2, preferably, the second edge 64 extends from the first edge 62 in a substantially perpendicular manner, and the second edge 64 has a length greater than the width of the access window 22 formed through the planar member 30 of the first housing section 18. In addition, preferably a distance between the second edge 64 and the fourth edge 66 of the door 16 is equal to or greater than the length of the access window 22. In this configuration, the door 16 is sized and shaped to completely cover or close the access window 22 in the planar member 30 of the first housing section 18.

The planar member 60 of the door 16 further defines a connection aperture 72 positioned substantially near the intersection of the third edge 66 and the fourth edge 68. The connection aperture 72 is sized and shaped to fit snugly, but still rotably around the pivot post 52 of the first housing section 18. In one embodiment, the door 16 further includes a reinforced or raised perimeter portion 74 running around the perimeter (i.e., the edges 62, 64, 66, and 68) of the door 16, thereby, adding strength and rigidity to the door 16. In one preferred embodiment, the door 16 is formed of a polymeric material. In one preferred embodiment, the door 16 is formed by injection molding of a suitable material such as acetal. Alternatively, other materials and/or manufacturing techniques can be employed to form the door 16.

Preferably, as best illustrated in FIG. 1, the hard drive 14 is generally rectangular in structure and sized and shaped to fit within the housing 12, more particularly between the first housing section 18 and the second housing section 20 of the housing 12. The hard drive 14 defines a first edge 80, a second edge 82, a third edge 84, and a fourth edge 86, which abut one another to define a rectangular perimeter of the hard drive 14. The hard drive 14 further defines the first surface 88 and a second surface 90 opposite the first surface 88. As best illustrated in the bottom view of FIG. 4 and the cross-sectional view of FIG. 7, the first surface 88 is at least partially defined by a printed circuit board. The hard drive 14 further includes at least one connection or access point 92 positioned on the first surface 88, or slightly offset from the first surface 88 towards the second surface 90, and near or adjacent the second edge 82 of the hard drive 14. The at least one connection point 92 is adapted to be accessed by a tape drive emulator as described below. In a preferred embodiment, the hard drive 14 includes a plurality of connection points 92 arranged as an elongated strip.

Figure 4:
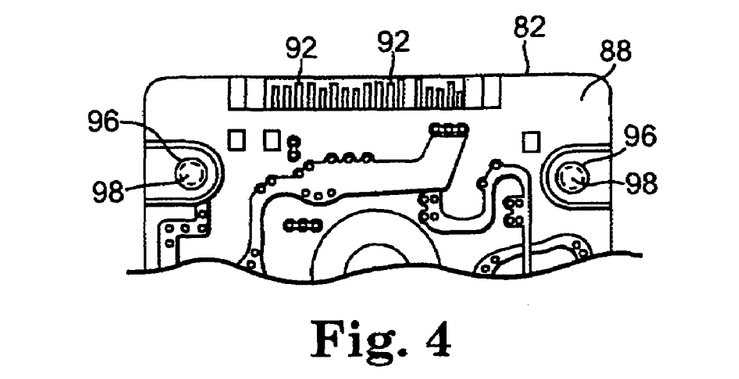
FIG. 4 is a partial bottom view of one embodiment of a hard drive of the data storage cartridge of FIG. 1.

The hard drive 14 further includes two attachment interface areas 96 to facilitate connection of the hard drive 14 to the first housing section 18. In one preferred embodiment, the attachment interface areas 96 define a threaded cavity 98 for receiving a screw or similar attachment device. The hard drive 14 or non-tape storage medium may take the form of a variety of storage media, such as a disc-shaped magnetic storage medium, a solid-state storage medium, an optical storage medium, a magneto-optical storage medium, and a holographic storage medium. The solid-state storage medium may be any non-volatile memory such as an erasable programmable read-only memory (EPROM), an electrically erasable programmable memory (FLASH memory) or the like.

As illustrated in FIG. 1, the second housing section 20 of the housing 12 includes a substantially planar member 100 defining an exterior surface 102 and an interior surface (not shown) opposite the exterior surface 102. The second housing section 20 further defines a leading wall 104, a trailing wall 106, a first side wall 108, and a second side wall 110 each extending from the planar member 100 opposite the exterior surface 102 about a perimeter of the planar member 100. In particular, the trailing wall 106 is positioned opposite the leading wall 104, and the first and second side walls 108 and 110 extend between the leading wall 104 and the trailing wall 106 opposite one another. The planar member 100 is sized similar to the planar member 60 of the first housing section 18. In addition, the walls 104, 106, 108, and 110 extend from the planar member 100 in a similar manner as the walls 34, 36, 38, and 40 extend from the planar member 30. Accordingly, each of the walls 104, 106, 108, 110 of the second housing section 20 are configured to mate with the walls 34, 36, 38, and 40 of the first housing section 18, respectively, to couple the first housing section 18 to the second housing section 20. In one embodiment, the first and second housing sections 18 and 20 are configured to be coupled at least in part via a snap connection. Preferably, the second housing section 20 is formed of a polymeric material. More preferably, the second housing section 20 is formed by injection molding or a suitable material such as polycarbonate. Alternatively, other materials and/or manufacturing techniques can be employed to form the second housing section 20.

In one preferred embodiment, the housing 12 has a length (i.e., a dimension along a direction parallel with the leading walls 34 and 104) of approximately 4.15 inches (105.4 mm), a width of approximately 4.01 inches (102 mm), and a height of approximately 0.85 inch (21.5 mm), which is typical for a conventional data tape cartridge. In other embodiments, the external dimensions of the housing 12 conform to one of a number of industry-standard form factors, such as the standard form factors of the Black Watch™ 9840 and the Royal Guard™ 3480, 3490E, 3490EL, and 9490EE magnetic storage tape cartridges manufactured by Imation Corp. of Oakdale, Minn.

Figure 5:
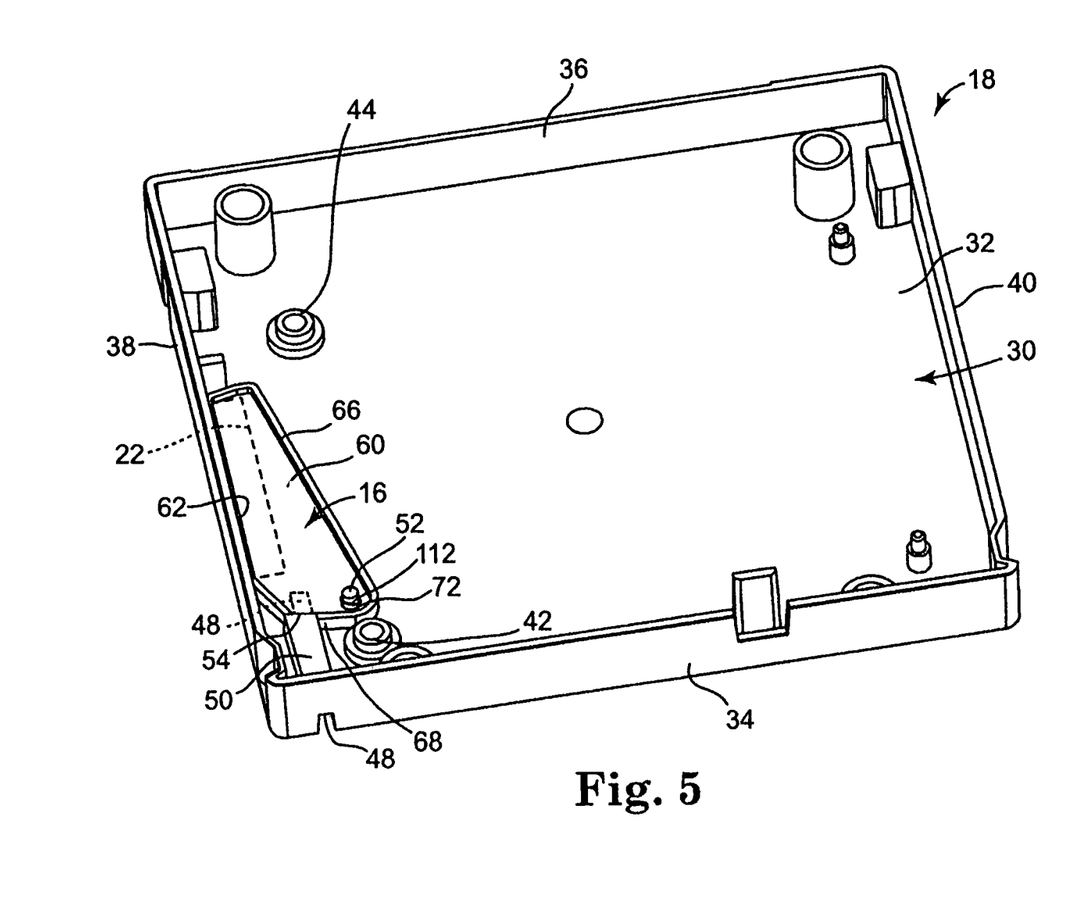
FIG. 5 is a perspective view of one embodiment of the first housing section and the door of the data storage cartridge of FIG. 1.

As illustrated in FIG. 5, during manufacture, the door 16 is coupled to the first housing section 18. In particular, the pivot post 52 of the first housing section 18 is rotatably received by the connection aperture 72 of the door 16. Preferably, the door 16 is sized such that upon attachment with the pivot post 52, the first edge 62 interacts with the first side wall 38 of the first housing section 18. In addition, as previously stated, the door 16 is sized such that the door 16 closes to fully cover the access window 22. When in the closed position of FIG. 5, the door 16 preferably covers a portion of the pin reception slot 48 extending beyond the interior track end 54 of the pin reception track 50. In particular, when closed, the fourth edge 68 of the door is preferably adjacent the interior track end 54.

A torsion spring 112 is placed around the pivot post 52 and coupled with the door 16 to bias the door 16 to the closed position, or as otherwise stated to bias the door 16 so the first edge 62 abuts the first side wall 38 of the first housing section 18. Notably, the torsion spring 112 allows the door 16 to rotate about the pivot post 52 upon application of an external force. However, upon removal of the external force, the torsion spring 112 is adapted to return the door 16 to the closed position. In one embodiment, a second torsion spring (not shown) is coupled to the pivot post 52 and the door 16 between the interior surface 32 of the first housing section 18 and the door 16. The second torsion spring provides an additional bias force to the door 16.

Figure 6:
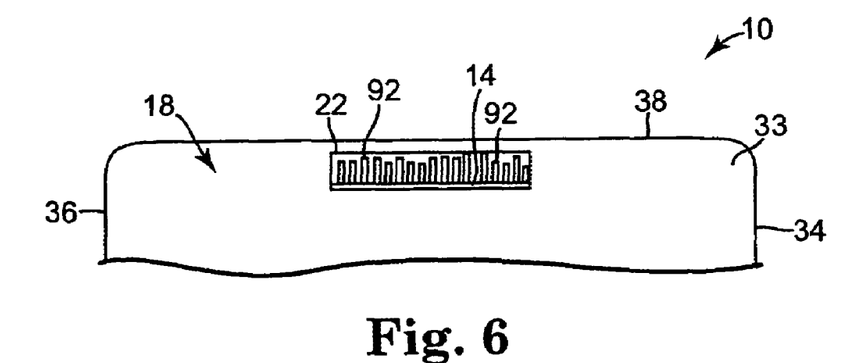
FIG. 6 is a partial bottom view of the data storage cartridge of FIG. 1 with the door in the open position.

Referring to FIG. 1 and FIG. 6 in which the door 16 is in the open position, the hard drive 14 is placed at least partially within the first housing section 18 such that the second edge 82 of the hard drive 14 is substantially adjacent the first side wall 38 of the first housing section 18. More particularly, the at least one connection point 92 is aligned with the access window 22 of the first housing section 18. As such, the at least one connection point 92 is accessible from a point external to the data storage cartridge via the access window 22. Notably, as illustrated in the cross-sectional view of FIG. 7, the door 16 is positioned between the hard drive 14 and the interior surface 32 of the first housing section 18. In one preferred embodiment, screws (not shown) or other attachment means are run from the exterior surface 33 of the first housing section 18 through the attachment pillars 42 and 44 and into the hard drive 14, namely the attachment interface areas 96, to secure the hard drive 14 to the first housing section 18. The attachment pillars 42 and 44 are adapted to maintain the first surface 88 of the hard drive 14 spaced from the interior surface 32 of the first housing section 18 to provide clearance for the door 16. Other or additional methods of attachment between the first housing section 18 and the hard drive 14 will be apparent to those of ordinary skill in the art.

Once the hard drive 14 is secured to the first housing section 18, the second housing section 20 is placed over the hard drive 14 to interact with the first housing section 18. In particular, the leading wall 104, the trailing wall 106, the first side wall 108, and the second side wall 110 of the second housing section 20 interact with the leading wall 34, the trailing wall 36, the first side wall 38, and the second side wall 40 of the first housing section 18, respectively. In one preferred embodiment, the first housing section 18 is coupled to the second housing section 20 via a snap fit connection. Other devices or method of securing the second housing section 20 to the first housing section 18 will be apparent to those of ordinary skill in the art. In one embodiment, the second housing section 20 is further coupled with the hard drive 16. As described above, the door 16 remains in the closed position of FIG. 5 due to the bias force of the torsion spring 112 unless exposed to an external force. Therefore, during storage of the data storage cartridge 10, the door 16 remains in the closed position to prevent or impede dust or other contaminants from entering the data storage cartridge 10.

Figure 8:
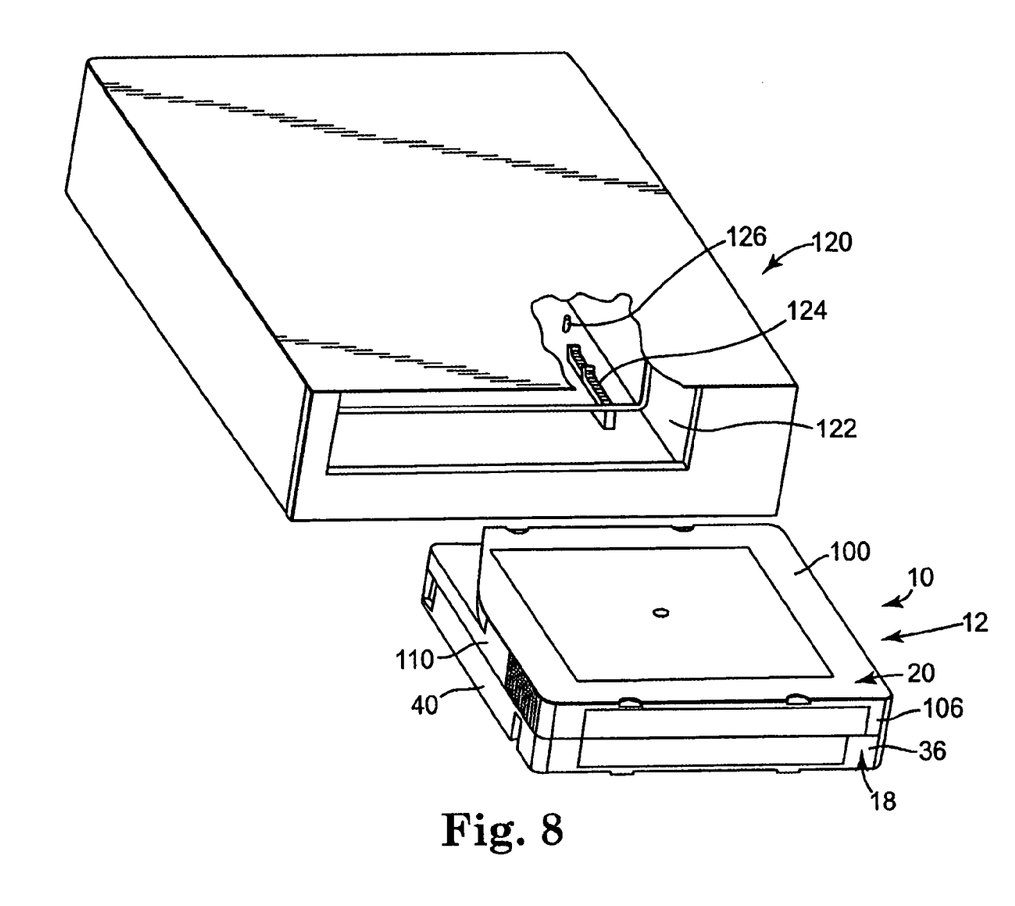
FIG. 8 is a perspective view of one embodiment of a tape drive emulator interacting with the data storage cartridge of FIG. 1.

Similar to the interaction between the conventional data storage tape cartridges and tape drives, the data storage cartridge 10 is adapted to interact with the tape drive emulator 120 as illustrated in FIG. 8. The tape drive emulator 120 is adapted to access the hard drive 14 (FIG. 1 and FIG. 6) within the housing 12 in order to read or write data to and from the hard drive 14. In one embodiment, the tape drive emulator 120 is further adapted to convert the data received from the hard drive 14 into a format emulating or imitating the typical data format retrieved from conventional, data storage tape cartridges as fully described in U.S. patent application Ser. No. 10/294,514 filed Nov. 14, 2002, entitled "Method and System for Emulating Tape Storage Format Using Non-Tape Storage Medium," which is hereby incorporated herein by reference. In this manner, the tape drive emulator 120 appears to other computing devices as a conventional data storage tape cartridge. Therefore, the drivers or software executing on the other computing devices need not be altered or updated to interact with the tape drive emulator 120 rather than the conventional tape drive with which the drivers and software were originally designed to interact. As such, replacement of a conventional tape drive with the tape drive emulator 120 allows an existing system or library to utilize data storage cartridges 10 including a hard drive 14 rather than the conventional, data storage tape cartridges.

Figure 7:
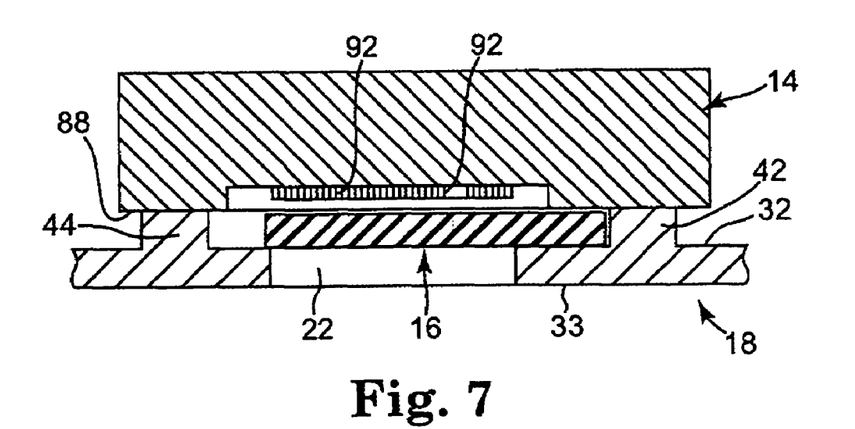
FIG. 7 is a cross-sectional view of one embodiment of the hard drive assembled to the first housing section of the data storage cartridge of FIG. 1.

Referencing FIG. 7 and FIG. 8, one embodiment of the tape drive emulator 120 includes a socket 122, an emulator connector 124, and an actuator pin 126 in order to access the hard drive 14 of the data storage cartridge 10. The socket 122 is adapted to selectively receive the data storage cartridge 10 and contains the emulator connector 124 and the actuator pin 126. The emulator connector 124 is adapted to interact with the at least one connection point 92 of the hard drive 14. The actuator pin 126 is configured to interact with the door 16, placing an external force upon the door 16 to open the door 16 and uncover the access window 22.

Figure 9:
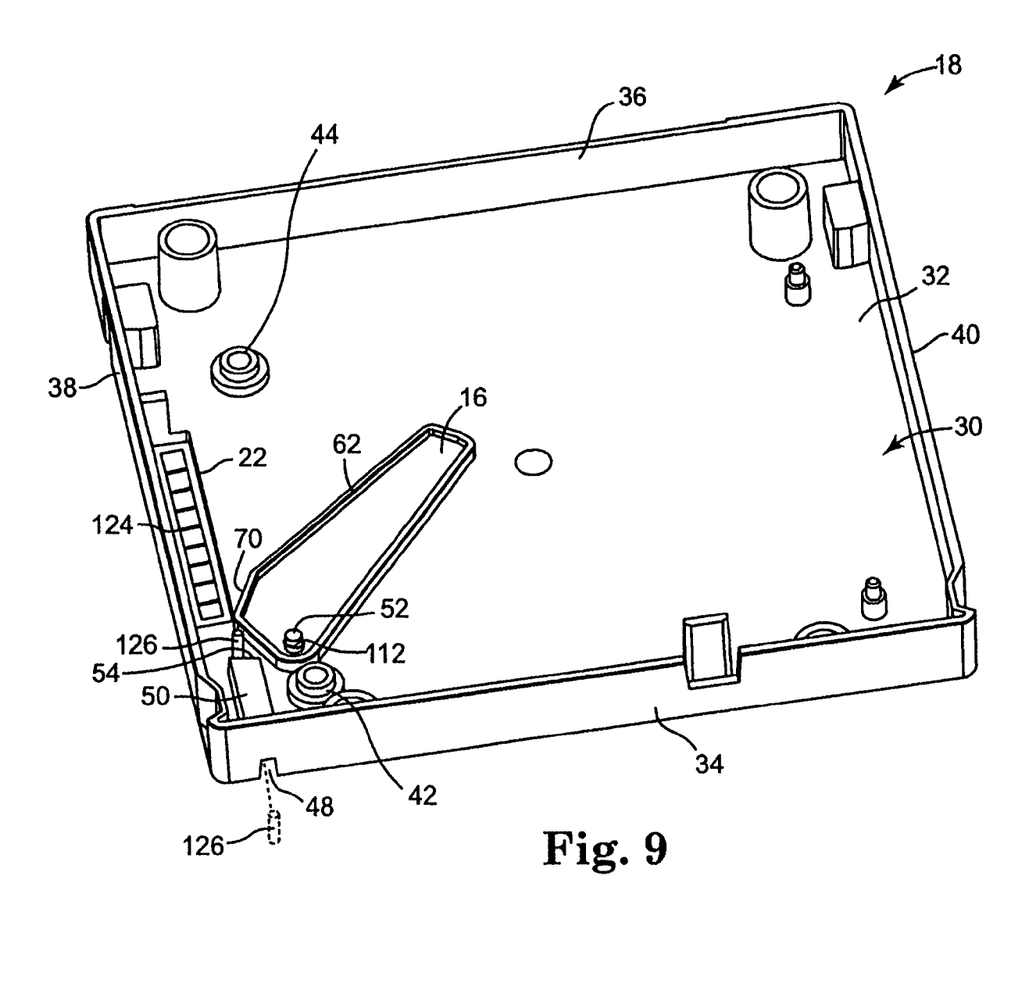
FIG. 9 is a perspective view of the first housing section of the data storage cartridge of FIG. 1 with the door in the open position.

In particular, during use, the data storage cartridge 10, is positioned with the leading walls 34 and 104 (FIG. 1) facing the tape drive emulator 120, and the data storage cartridge 10 is slid into the socket 122 of the tape drive emulator 120. As the data storage cartridge 10 is slid into the socket 122, the actuator pin 126 is aligned with the pin reception slot 48 of the first housing section 18 of the data storage cartridge 10 as illustrated with hidden lines in FIG. 9. Notably, FIG. 9 illustrates the first housing section 18 and the door 16 with the hard drive 14 (FIG. 7) removed for clarity. FIG. 9 also includes the emulator connector 124 and the actuator pin 126 illustrative purposes. As the data storage cartridge 10 is slid further within the socket 122, the actuator pin 126 is slid along the pin reception slot 48 and through the pin reception track 50. Eventually, the actuator pin 126 interacts with the fourth edge 68 of the door 16 applying an external force to the door 16. Further sliding of the data storage cartridge 10 into the socket 122 results in the actuator pin 126 applying additional external force to the door 16 overcoming the bias of the torsion spring 112 (and any additional torsion spring(s) or other biasing components not shown), thereby loading the torsion spring 112, and causing the door 16 to rotate about the pivot post 52 of the first housing section 18. Once the data storage cartridge 10 is placed as far into the tape drive emulator 120 as allowed, the actuator pin 126 has rotated the door 16 to a fully open position, as illustrated in FIG. 9. When in the open position, the door 16 leaves the access window 22 uncovered and substantially unobstructed. Notably, once in the open position, the angled portion 70 of the first edge 62 provides additional clearance of the access window 22 as described above.

When the door 16 is in the open position of FIG. 9, the emulator connector 124 is aligned with the access window 22. As such, the emulator connector 124 can access the at least one connection point 92 (FIG. 6 and FIG. 7) of the hard drive 14 through the access window 22. The tape drive emulator 120 sends or retrieves data from the hard drive 14 to a master computer via the at least one connection point 92 and the emulator connector 124. Upon removal of the data storage cartridge 10 from the tape drive emulator 120, the data storage cartridge 10 is slid in the opposite direction, and the actuator pin 126 slides back towards the leading edges 34 and 104 of the data storage cartridge 10, removing the external force on the door 16 and exiting the pin reception slot 48. Removal of the external force applied by the actuator pin 126 allows the door 16 to return to its closed position due to the bias or unloading force of the torsion spring 112 (and/or other biasing components). Therefore, when in the storage or closed position, the data storage cartridge 10 is closed decreasing the amount of dust or other contaminates entering the housing 12 that can damage the hard drive 14.

Figure 10:
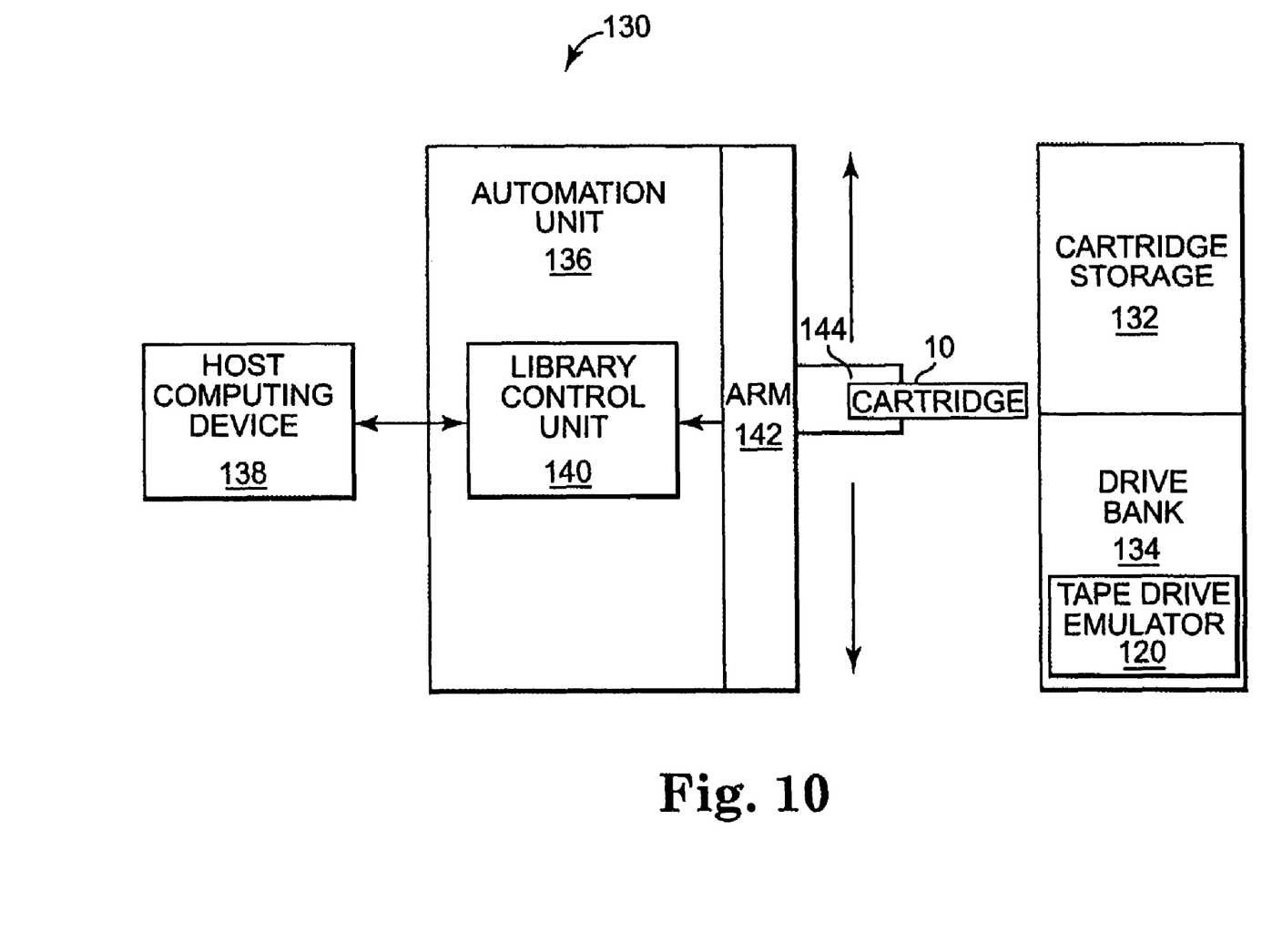
FIG. 10 is a block diagram of one embodiment of a library system incorporating the data storage cartridge of FIG. 1.

Notably, since the data storage cartridge 10, or more particularly, the housing 12, takes on the form factors of traditional, data storage tape cartridges, the data storage cartridge 10 is adapted to be used with traditional library systems. One embodiment of an automated library system 130 incorporating at least one data storage cartridge 10 is generally illustrated in FIG. 10. The automated library system 130 includes a cartridge storage 132, a drive bank 134, an automation unit 136, and a host computing device 138. Generally, the host computing device 138 signals the automation unit 136 to retrieve a particular data storage tape cartridge 10. The automation unit 136 removes the particular data storage tape cartridge 10 from the cartridge storage 132 and inserts the particular data storage tape cartridge 10 into the tape drive emulator 120 in the drive bank 134. When in the tape drive emulator 120, the host computing device 138 accesses the particular data storage cartridge 10 to read from or write to the data storage cartridge 10. Upon reading and/or writing to the data storage cartridge 10, the host computing device 138 signals the automation unit 136, and the automation unit 136 returns the particular data storage tape cartridge 10 to the cartridge storage 132.

The cartridge storage 132 provides a plurality of storage cartridge locations (not shown) for storage. Each storage location, also referred to as a cell, provides storage for a single data storage cartridge 10, and each data storage cartridge 10 has an assigned storage location within the cartridge storage 132. In addition, each of the data storage cartridges 10 stored in the cartridge storage 132 can include identifying information, such as a label, a bar code, or a radio frequency (RF) tag, by which the automation unit 136 identifies the individual data storage cartridges 10. Due to use of the automation unit 136 in the automated library system 130, the cartridge storage 132 is created with precise dimensions, as required by the automation unit 136, to allow the automation unit 136 to easily access a particular storage location within the cartridge storage 132. In one embodiment, the cartridge storage 132 includes a plurality of conventional, data storage tape cartridges as well as a plurality of data storage cartridges 10.

The drive bank 134 includes at least one, and preferably a plurality of, drive locations (not shown). Each of the drive locations is adapted to receive a conventional tape drive or a tape drive emulator 120. The drive bank 134 is also constructed with precise measurements, as required by the automation unit 136, to allow the automation unit 136 to easily access a particular tape drive or tape drive emulator 120 within a particular drive location. Each of the tape drives or tape drive emulators 120 is connected to the host computing device 138 such that the host computing device 138 can access a data storage tape cartridge or a data storage cartridge 10 via the tape drive or the tape drive emulator 120, respectively. In one embodiment, the drive bank 134 only includes the tape drive emulator 120. In another embodiment, the drive bank 134 includes at least one conventional tape drive and at least one tape drive emulator 120.

The automation unit 136 facilitates movement of the data storage cartridges 10 between the cartridge storage 132 and the drive bank 134. The automation unit 136 includes a library control unit 140 and a robotic arm 142. The library control unit 140 is configured to receive instruction and direction from the host computing device 138 and to generate signals to activate the automation unit 136 in accordance with the instructions received. In particular, the library control unit 140 interprets storage access requests from the host computing device 138, and provides signals to control the motion and operation of the robotic arm 142. The robotic arm 142 typically includes a gripper 144 to facilitate secure handling of the data storage cartridges 10. The host computing device 138 is any computer system configured to relay access signals from a user (not shown) to the automation unit 136 and to read and write to the data storage cartridges via the tape drive emulator 120 contained within the drive bank 134.

During use, in response to communication signals from the host computing device 138, the library control unit 140 generates control signals directing the robotic arm 142 to retrieve the appropriate data storage cartridge 10 from the cartridge storage 132 and to insert the data storage cartridge 10 into one of the tape drive emulators 120 in the drive bank 134. In response to the signals from the library control unit 140, the robotic arm 142 traverses the cartridge storage 132 and engages the cartridge 10 using the gripper 144. The robotic arm 142 then moves the cartridge 10 to the drive bank 134 to insert the cartridge 10 into one of the tape drive emulators 120. Upon insertion of the data storage cartridge 10 into one of the tape drive emulators 120, the host computing device 138 can write data to and read data from the data storage cartridge 10. In one embodiment, the automated library system 130 similarly works to access conventional, data storage tape cartridges via conventional tape drive contained with the drive bank 134. Notably, the data storage cartridge 10 can similarly be used with individual or stand-alone tape drive emulators 120 rather than in the library context.

Because the data storage cartridges 10 conform to standard form factors or dimensions of the conventional data storage tape cartridges, the conventional data storage tape cartridge and the data storage cartridge 10 are mechanically indistinguishable by the automation unit 136. In this matter, the mechanical interfaces between the automation unit 136 need not be adapted or upgraded to support the substitution of the data storage cartridges 10 for the typical data storage tape cartridges.

In particular, existing robotic arms adapted to grasp and interact with typical data storage tape cartridges will be able to grasp and interact with data storage cartridge according to the present invention since the two cartridges have similar external dimensions. Therefore, traditional and existing cartridge libraries that replace the traditional tape drives with tape drive emulators will be able to utilize the data storage cartridges and, in particular, will be able to utilize the efficiencies of hard drive storage over traditional linear tape storage. In other words, use of hard drives will allow the libraries to support true random access to individual files stored within the hard drives, thereby decreasing file retrieval time. Further, by including the door to close the data storage cartridge and prevent contaminants from contacting the hard drive, the data storage cartridge and associated hard drive are able to maintain stored data with greater longevity and with fewer complications.

Although specific embodiments have been illustrated and described herein, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate the present invention may be implemented in a very wide variety of embodiments. This application is intended to cover any adaptations or variations of the embodiments discussed herein. Therefore, it is manifestly intended that this invention be limited only by the claims and the equivalence thereof.

For example, the door has been described with reference to a particular shape or configuration, assembly technique, and method of transitioning between the open and closed positions. Alternatively, the door can be formed in a variety of shapes and configurations, can be attached in a variety of assembly techniques, and can incorporate any of a variety of transitioning methods. Any such alternatives that allow the door to selectively cover the access window and to transition between the open and closed position upon insertion or removal of the data storage cartridge from the tape emulator are equally applicable to and within the scope of the present invention. Similarly, although described as a torsion spring, any of a variety of biasing devices capable of biasing the door in the closed position are also equally applicable to and within the scope of the present invention.

What is claimed is:

1. A data storage cartridge configured to be received by a socket including an actuator pin, the data storage cartridge comprising:
   a housing defining an access window and including:
      a planar member surrounded by a plurality of side walls and defining an access window, wherein
      an elongated pin reception slot is defined through the planar member, at least a portion of the elongated pin reception slot enclosed by
      a pin reception track that is entirely disposed within the housing and enclosing a portion, but less than an entirety, of, the elongated pin reception slot configured to receive the actuator pin of the socket; and
   a non-tape storage medium maintained within the housing and configured to be accessed from a point external to the data storage cartridge via the access window.

2. The data storage cartridge of claim 1, wherein the access window is elongated and extends substantially parallel to an elongated extension of the pin reception slot.

3. The data storage cartridge of claim 1, wherein one of the plurality of side walls is a leading wall configured to be inserted into the socket before the other of the plurality of side walls, and wherein the pin reception slot extends through the leading wall.

4. The data storage cartridge of claim 3, wherein the pin reception slot extends from the leading wall towards the access window.

5. The data storage cartridge of claim 1, wherein the access window is formed in the planar member near a first side wall, and the, pin reception slot extends from a second side wall adjacent the first side wall toward the access window.

6. The data storage cartridge of claim 1, wherein the pin reception track encloses a substantial portion of the pin reception slot.

7. The data storage cartridge of claim 1, further comprising:
   a movable door selectively covering the access window, the door being configured such that when the pin reception slot receives the actuator pin, the actuator pin interacts with and moves the door away from the access window.

8. The data storage cartridge of claim 1, in combination with the socket including the actuator pin, wherein the socket is configured to slidably receive the data storage cartridge, and the actuator pin extends perpendicular to a direction the data storage cartridge is slid into the socket.

9. The combination of claim 8, wherein the pin reception slot of the data storage cartridge extends in a direction, substantially perpendicular to the actuator pin of the socket when the data storage cartridge is positioned within the socket.

10. The data storage tape cartridge of claim 1, wherein the pin reception slot extends through and from a first one of the side wells to a slot end opposite the first side wall, and further wherein the pin reception track is U-shaped, extending from the first side wall, over the pin reception slot and along the planar member, to a track end opposite the first side wall, the slot end being located beyond the track end opposite the first side wall.

11. A data storage cartridge configured to be received by a socket including an actuator pin, the data storage cartridge comprising:

a housing including a planar member surrounded by a plurality of side walls and an enclosed pin reception track, the planar member defining an access window and an elongated pin reception slot extending substantially parallel to an elongated extension of the access window, wherein the pin reception track encloses at least a portion of the pin reception slot and the pin reception slot is configured to receive the actuator pin of the socket; and a non-tape storage medium maintained non-movably affixed within the housing and configured to be accessed from a point external to the data storage cartridge via the access window.

12. The data storage cartridge of claim 11, wherein one of the plurality of side walls is a leading wall configured to be inserted into the socket before the other of the plurality of side walls, and wherein the pin reception slot extends through the leading wall.

13. The data storage cartridge of claim 12, wherein the pin reception slot extends from the leading wall towards the access window.

14. The data storage cartridge of claim 11, wherein the access window is defined in the planar member near a first side wall, and the pin reception slot extends from a second side wall adjacent the first side wall toward the access window.

15. A method of interaction between a data storage cartridge and a socket, the method comprising:

positioning the data storage cartridge within the socket, wherein the data storage cartridge defines an access window and an elongated pin reception slot, and the socket includes an actuator pin;

sliding the data storage cartridge into the socket including sliding the actuator pin within the pin reception slot and into a covered pin reception track;

sliding the actuator pin out of the covered pin reception track while remaining in the pin reception slot; and accessing a non-tape data storage medium positioned within the socket through the access window.

16. The method of claim 15, wherein sliding the actuator pin of die socket within the pin reception slot includes:

moving the actuator pin to contact a door covering the access window and maintained within the data storage cartridge, and moving the door away from the access window.

17. The method of claim 16, wherein the pin reception slot extends through a side wall of the data storage cartridge that extends substantially perpendicular to the access window, and sliding the actuator pin of the socket includes sliding the pin through the side wall.

18. The method of claim 15, wherein the pin reception slot is formed in a planar member of the data storage cartridge, the planar member defining the access window, and wherein sliding the actuator pin includes sliding the actuator pin through the planar member.

19. The method of claim 15, wherein sliding the actuator pin of the socket includes moving the pin toward the access window.

20. The method of claim 15, wherein sliding the actuator pin of the socket includes moving the actuator pin in a direction substantially parallel to an elongated extension of the access window.

* * * * *

UNITED STATES PATENT AND TRADEMARK OFFICE
CERTIFICATE OF CORRECTION

PATENT NO. : 7,463,451 B2
APPLICATION NO. : 11/520504
DATED : December 9, 2008
INVENTOR(S) : Leo W. Spychalla It is certified that error appears in the above-identified patent and that said Letters Patent is hereby corrected as shown below:

Column 10
    Line 41, "the, pin" should read --the pin--.
    Line 57, "direction," should read --direction--.
    Line 62, "wells" should read --walls--.

Column 11
    Line 22, "cartidge" should read --cartridge--.

Column 12
    Line 11, "die" should read --the--.

Signed and Sealed this

Twenty-second Day of September, 2009

David J. Kappos
*Director of the United States Patent and Trademark Office*